DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED AUGUST 31, 1971

889 O.G. 1366

T889,019
ALPHA-IODO KETONES AND PHOTOGRAPHIC ELEMENTS CONTAINING THEM

Fredrick L. Hamb, 1669 Lake Ave., Rochester, N.Y. 14650

Filed Oct. 1, 1970, Ser. No. 77,379
**Int. Cl. G03c *1/00***
U.S. Cl. 96—88
No Drawing. 17 Pages Specification

Alpha-iodo ketones having an electron-attracting group in the beta position are light sensitive and when exposed to visible light decompose with evolution of free radicals. When coated on a photographic support with a component which changes color upon attack by free radicals, e.g., a starch-potassium iodide mixture or a triphenylmethane dye, a photographic element is obtained which is capable of print-out image formation upon exposure. The ketone can be coated above, below or with the starch-iodide component.

The light sensitive alpha-iodo ketones are of the structure (a)

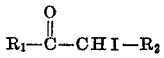

wherein $R_1$ is a hydrocarbon group such as aryl, e.g., phenyl or alkyl, e.g., lower alkyl; and $R_2$ is an electron-withdrawing group such as alkylcarbonyl, alkoxycarbonyl, arylcarbonyl, cyano or the like; or (b)

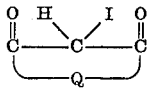

wherein Q represents the atoms necessary to complete a saturated or unsaturated hydrocarbon ring. The image can be fixed by removing the unexposed alpha-iodo ketone with a solvent.

Examples of the alpha-iodo ketones include:

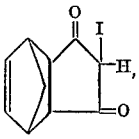

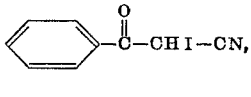

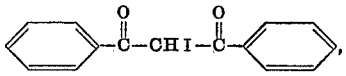

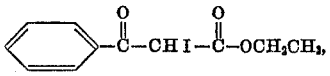

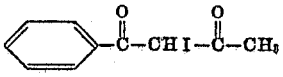

and